March 22, 1927. 1,622,119
T. P. KEATON
TURPENTINE GATHERING APPARATUS
Filed March 11, 1926
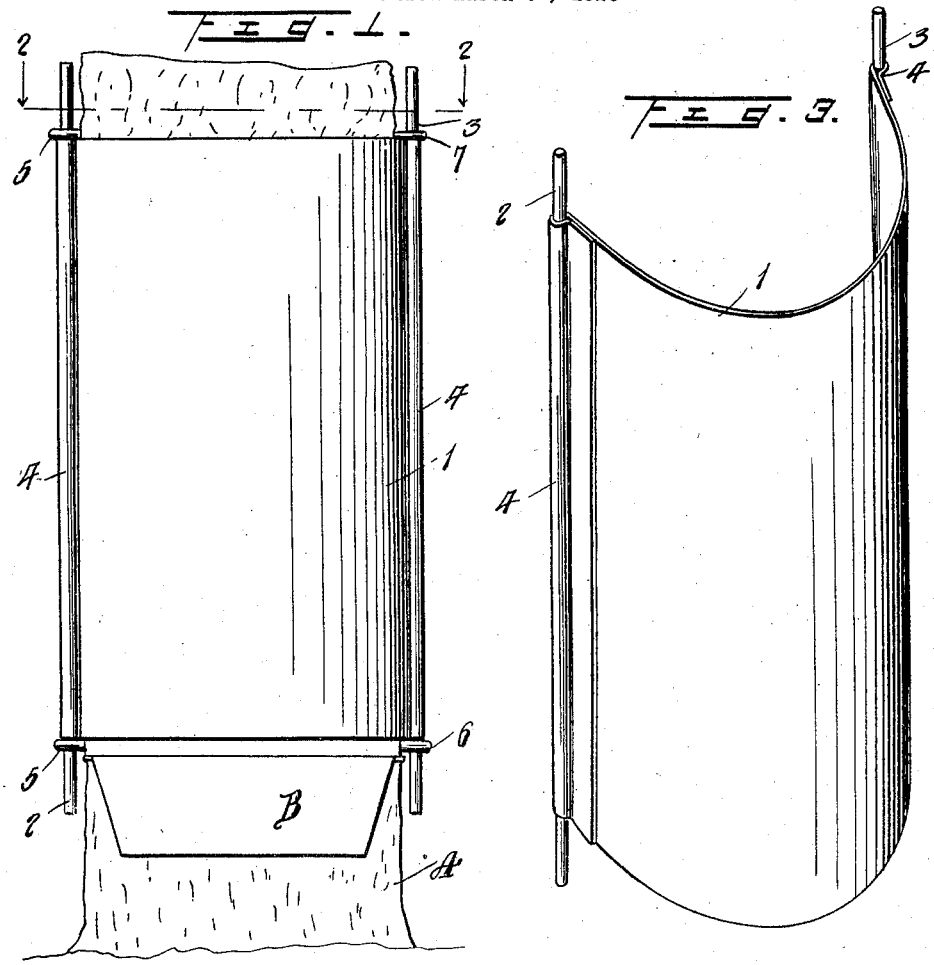
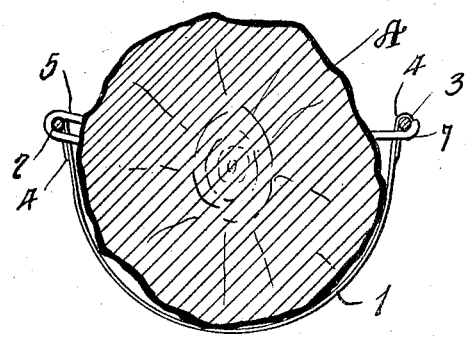
Inventor
T. P. Keaton.
By
Attorney Patented Mar. 22, 1927.

1,622,119

UNITED STATES PATENT OFFICE.

THEODORE P. KEATON, OF PEARSON, GEORGIA.

TURPENTINE-GATHERING APPARATUS.

Application filed March 11, 1926. Serial No. 93,966.

The invention relates to apparatus used in the collection of turpentine and other tree saps.

In gathering turpentine it is the practice to cut what is commonly known as a streak in the bark and wood of the tree immediately under the bark, the streak usually being V-shaped so that the sap will run from the cut portion and drip from the point of the V into a gathering cup or bucket.

Because of exposure to the weather, the wind, rain, and sun, the streak in a few days or a week dries so that it is necessary to chip the wood and bark away to permit the sap to continue to run, this practice being followed until the streaks cut in the tree are too high to reach, when the tree is then available only for timber.

This invention has for its object the improvement of the apparatus used by including a cover device for the cut in the tree so as to protect the streak from the influence of the weather, and this prolongs the period during which the sap will exude from the streak two or three times the period of an uncovered streak, thus adding to the period during which turpentine may be extracted from the tree before the tree is good only for timber.

To this end the invention comprises a semi-cylindrical plate preferably of sheet metal and pivotally mounted at one of its side edges to the trunk of the tree and adapted to be releasably secured at its other side edge to the tree trunk at the other side of the chipped portion forming the streak.

The invention will be described in detail hereinafter and will be found illustrated in the accompanying drawings, in which—

Figure 1 is a front view of a tree trunk showing the cover in position,

Figure 2 is a view in perspective of the cover removed from the tree, and

Figure 3 a horizontal sectional view of the tree trunk and cover on a plane indicated by the line 3—3 of Figure 1.

In the drawings similar reference characters will be used to designate corresponding parts throughout the several views.

The invention is shown in Figure 1 to be applied to a trunk of a tree, designated A from which the sap is to be extracted in the usual well known manner, and B indicates a cup or bucket used to catch the sap exuding from the tree.

To protect the chipped portion of the tree from the action of the sun and other weather conditions, a cover is provided comprising a semi-cylindrical member 1 which may be made as shown in the drawings of sheet metal, and having rods 2 and 3 secured in its side edges by bending the edge of the metal back on itself as shown at 4, the ends of the rods 2 and 3 extending above and below the top and bottom, respectively of the member 1. The member 1 is secured in position on the tree by means of staples or other analogous fastening members 5 enclosing the projecting ends of the rod 2 said staples being driven into the tree at one side of the chipped portion from which the sap is being extracted. The other edge of the member 1 is adapted to be secured by means of a staple 6, or analogous member that engages the lower extended end of the rod 3, and a hook 7 adapted to engage the upper extended end of the rod 3.

In operation it will be understood that when the member 1 is in a covering position as shown in Figure 1 and also in Figure 3, and as above described, the chipped portion of the tree is protected from the weather as stated. When it is desired to chip or scrape the tree to reopen the wood of the tree to permit sap to exude, as this has to be done from time to time, the cover is released from the hook 7 and the plate may then be bent slightly to release the lower end of the rod 3 from the staple 6, and the plate will then swing on the rod 2 as a pivot so that chipping or scraping may be accomplished, after which the cover will be replaced in its former position.

What is claimed is:—

1. In turpentine gathering apparatus, a cover for the streaks in the tree trunk, comprising a plate of metal pivotally secured to the tree trunk at one side of the streaks to swing horizontally and to closely engage the tree trunk in one position, and means to secure the plate in position.

2. In turpentine gathering apparatus, a cover for the streaks in a tree trunk, comprising a semi-cylindrical plate, rods secured to the side edges of said plate, said rods extending above and below the top and bottom edges of the plate, the projecting ends of one of the rods pivotally mounted on the tree trunk, and means engaging the projecting ends of the other rod to secure the plate in covering position.

3. In turpentine gathering apparatus, a cover for the streaks in a tree trunk, comprising a semi-cylindrical plate, rods secured to the side edges of said plate, said rods extending above and below the top and bottom edges of the plate, staples driven into the tree trunk and enclosing the projecting ends of one of the rods to pivotally mount the plate thereon, a staple adapted to engage one of the projecting ends of the other rod, and a hook adapted to engage the other end thereof to hold the plate in covering position.

In testimony whereof I affix my signature.

THEODORE P. KEATON.